(12) United States Patent
Golly et al.

(10) Patent No.: US 6,612,166 B2
(45) Date of Patent: Sep. 2, 2003

(54) VARIABLE VISCOSITY DAMPER FOR VANE TYPE ANGLE OF ATTACK SENSOR

(75) Inventors: Timothy T. Golly, Lakeville, MN (US); Thomas J. Bachinski, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 10/020,839

(22) Filed: Dec. 13, 2001

(65) Prior Publication Data

US 2003/0110852 A1 Jun. 19, 2003

(51) Int. Cl.[7] .............................................. G01P 13/00
(52) U.S. Cl. .............................. 73/170.02; 73/170.01; 73/861.74
(58) Field of Search ........................... 73/180, 861.77, 73/170.02–170.09

(56) References Cited

U.S. PATENT DOCUMENTS 3,882,721 A * 5/1975 Neary et al. ............... 73/188
3,893,337 A * 7/1975 Jones ........................ 73/188

* cited by examiner

Primary Examiner—Hezron Williams
Assistant Examiner—Jermaine Jenkins
(74) Attorney, Agent, or Firm—Westman, Champlin & Kelly, P.A.

(57) ABSTRACT

An angle of attack sensor has a vane mounted on a rotating shaft that rotates in response to angle of attack. The shaft has a rotor at one end which is in a chamber in a housing supporting the shaft. The chamber includes a space around the rotor filled with either an electrorheological or magnetorheological fluid. A controller is used to provide an electrical signal, such as a signal controlling an electromagnet, to change the magnetic field affecting the fluid in response to various aircraft parameters to thereby control the viscosity of the electrorheological or magnetorheological fluid in the chamber and control the amount of damping of the rotating vane.

14 Claims, 1 Drawing Sheet

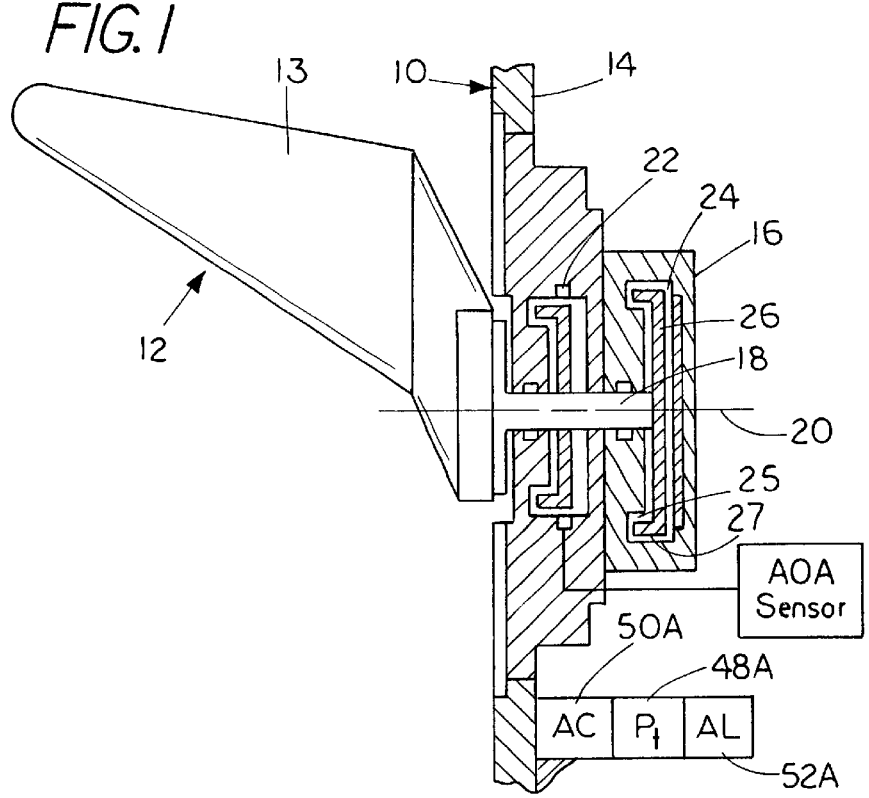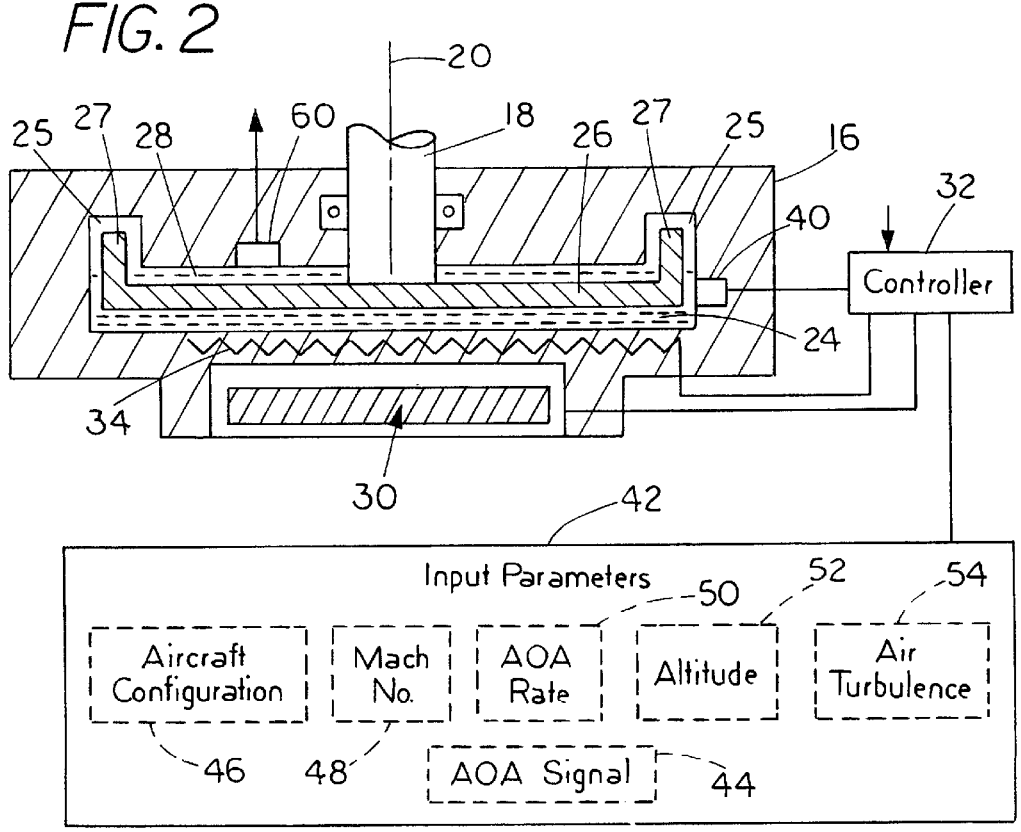

VARIABLE VISCOSITY DAMPER FOR VANE TYPE ANGLE OF ATTACK SENSOR

BACKGROUND OF THE INVENTION

The present invention relates to a damper for dampening rotational movements of a vane type angle of attack sensor, which will insure that the vane will not invert and also will reduce vane dither and "over shoot" to allow a stable measurement of angle of attack. The damper includes a rotor in a housing chamber having a clearance space filled with an electrorheological or magneto-rheological fluid the viscosity of which is varied to control the damping of movement of the rotor.

Existing vane type angle of attack sensors include dampers that have a fluid filled housing chamber with a rotor in the housing chamber, but which utilize a fluid that has a known viscosity at selected temperatures. The fluid typically is heated to a nominally constant temperature to attempt to avoid changes in viscosity due to differences in ambient temperatures that are encountered during operation of an aircraft.

In conventional systems, a vane that is optimally damped for high mach number or high air speed, will be damped more than is needed at a lower speed. This causes a lower response time at lower speeds. If a vane is optimally damped for a lower speed, the response time at higher speeds suffers. It has been found that in certain instances, the standard damping fluid is not adequately controllable for maintaining suitable damping across a wide range of operational parameters, such as aircraft velocity and ambient temperature.

SUMMARY OF THE INVENTION

The present invention utilizes a rotor attached to the shaft of a rotating vane angle of attack sensor, which is in a housing and is surrounded by an electrorheological or magnetorheological fluid. The fluid viscosity is controlled and changed in response to a signal, generally an electrical signal, that will vary either the voltage across the electrorheological fluid or the strength of a magnetic field affecting a magnetorheological fluid. The control signals are based upon outside parameters such as aircraft velocity (mach number), turbulence, the actual aircraft configuration, altitude, angle of attack, and rate of change of angle of attack. The various factors are called aircraft operational parameters.

Continuously adjusting the damping to the proper level based on current flight conditions, including the aircraft operational parameters mentioned, allows the vane to perform optimally at such flight conditions. Variations in viscosity of the signal responsive fluid can be accomplished by providing a variable electrical signal through a control circuit that will have an input from the air data computer indicating the level of damping desired in real time. The change in viscosity can be on the order of microseconds so that real time control is achieved.

BRIEF DESCRIPTION OF THE DRAWINGS

FIG. 1 is a view of a typical aircraft vane type air data sensor mounted on an aircraft skin.

FIG. 2 is a schematic sectional view of a typical variable viscosity damper made according to the present invention, with a schematic representation of a control circuit.

DETAILED DESCRIPTION OF THE ILLUSTRATIVE EMBODIMENTS

In FIG. 1, an aircraft indicated generally at 10 has a vane type angle of attack sensor 12 that is supported on the aircraft skin 14. A vane 13 of sensor 12 is mounted on a shaft 18 that is rotatably mounted on a housing 16. Housing 16 supports suitable bearings for the shaft 18. The vane 13 will rotate about the shaft axis indicated at 20. The. shaft 18 drives a suitable encoder to determine the angle of the shaft from a reference position. An encoder is shown schematically at 22 and can be any type of desired encoder, such as the potentiometers presently used.

Additionally, the shaft 18 extends into a damping chamber 24 formed in housing 16. The damping chamber 24 is of size to receive a rotor 26 that is fixed to the shaft, and leaving a chamber clearance space 28 around the rotor 26. The chamber 24 has an outer ring type recess 25 and the rotor 26 has an annular ring or flange 27 that extends into the recess. The Chamber space 28, including parts of the recess 25 is filled with a fluid that can be changed in viscosity in response to a signal, usually an electrical signal. The electrical signal can be directly provided as a voltage across the damping fluid between provided electrodes or can be applied to an electromagnet to vary a magnetic field. In the form shown the variable electrical signal controls an electromagnet 30 and is provided by a controller 32. If desired, the rheological fluid in chamber space 28 (either electric or magnetic signal response) can be controlled by the level of the voltage or current that is provided to circuitry to influence the viscosity of the fluid.

A resistance heater 34 or other suitable heater is provided in the housing 16 adjacent to the chamber 24 to provide a heat source that will maintain the rheological fluid in the chamber space 28 at or near a set temperature, regardless of the ambient temperature. A temperature sensor 40 is mounted in a suitable location in the housing 16 for providing a feedback signal to the controller 32 so that the temperature is maintained at a set level in response to the feedback signal. A heater with self-regulating temperature characteristics could alternately be used. The viscosity of rheological fluid is not nearly as temperature dependent as presently used fluids.

Additionally, the controller 32 receives as inputs various aircraft operational parameters shown generally in a block 42, and these input parameters can include, but are not limited to, the actual angle of attack, indicated at 44, from the encoder 22 of sensor 12 fed back to the controller 32. The aircraft configuration factors, which provide a suitable weighting to other inputs, indicated at 46; mach number or airspeed indicated at 48 from a pitot tube sensor 48A (FIG. 1); altitude indicated at 52 from an altimeter 52A; and a measure of air turbulence 54 and angle of attack rate, which are sensed by accelerometers 50A on the aircraft or by monitoring short term perturbations in the angle of attack signal.

The rheological fluid in space 28 is either an ER or MR fluid and carries particles that will gradually separate over time if they are not mixed. Therefore, a suitable mixing device is provided. It could be a mechanical stirrer in the chamber space 28 that would be a small rotating blade at the bottom of the space, or an ultrasonic transducer 60 mounted in the housing 16 adjacent to the chamber 24 at one or more strategic locations.

The ultrasonic transducer 60 is operated by the controller 32 to cause ultrasonic vibration and fluid agitation, for example when the aircraft is first started, or at periodic intervals, as desired.

When the aircraft 10 is operational, the heater 34 is controlled so that the variable viscosity fluid in the chamber space 28 is maintained at or near a desired set temperature.

The viscosity of the rheological fluid is then varied from the viscosity at the temperature by the controller 32. The controller provides an electric signal, either a voltage or a current, to control the rheological fluid viscosity at a desired level, which will be programmed into the controller. In other words, at a set level of aircraft operational parameters, a known electrical signal will be provided by the controller to an electromagnet 30, if the fluid is a magnetorheological fluid to provide a variable strength magnetic field influencing the fluid in chamber space 28, the variable magnetic field controls the viscosity of the rheological fluid at a level as needed for optimum damping in that time. As the input aircraft operational parameters change, the controller 32 changes the level of the signal to the magnet 30 or to contacts providing a voltage action to fluid to change the viscosity of the rheological fluid. The control inputs also can include a rate signal from the angle of attack encoder, so that if the oscillation or rotational movement of the vane is high speed, viscosity can be increased. The fluid can be made to range from the viscosity with no electrical signal up to being a solid, which would freeze the vane in position.

The fluid in chamber space 28 will dampen the oscillations, dither, and over shoot of the vane 13 so that a true angle of attack signal will be obtained. Additionally, the signal from the angle of attack encoder 22 on the vane shaft 18 will indicate that the vane 13 is becoming reversed and movement can be stopped by the controller to prevent reversal, so the vane remains oriented in the appropriate direction.

If the angle of attack increases beyond a certain level, the controller can solidify the rheological fluid to freeze the rotation of the rotor, shaft and vane, by increasing the electrical signal, either a voltage directly acting on electrorheological fluid or current to an electromagnet 30 providing a magnetic field to a magnetorheological fluid.

The continuous adjustment of the damping in response to the inputs from the controller 32 will insure that the damping is at a proper level based upon the current flight conditions so that the vane 13 can perform optimally at all aircraft flight conditions. Continuously variable levels of damping for the vane is provided. The controller is programmed so that the damping level is correlated directly to the flight conditions indicated by the input aircraft operational parameters.

Although the present invention has been described with reference to preferred embodiments, workers skilled in the art will recognize that changes may be made in form and detail without departing from the spirit and scope of the invention.

What is claimed is:

1. A variable viscosity damper for an aircraft angle of attack sensing vane, comprising a sensing vane, a housing rotatably mounting the vane, a chamber defined in the housing, a filling of a fluid in the chamber, the fluid being coupled to the vane to create a drag load resisting rotation of the vane, the fluid having a variable viscosity controllable by a signal, and a controller to provide the signal at levels which are functions of at least one aircraft operational parameter.

2. The variable viscosity damper of claim 1 and a rotor that rotates with the vane mounted in the chamber, the fluid filling the chamber and contacting the rotor.

3. The variable viscosity damper of claim 2, wherein the fluid is controllable in viscosity in response to an input electrical signal, at least one instrument monitoring at least one aircraft operational parameter providing at least one input signal to the controller, and the controller providing a continuously variable output signal in response to the at least one variable aircraft operational parameter.

4. The variable viscosity damper of claim 3, wherein the vane is mounted on a shaft, the shaft being rotatably mounted in the housing and extending into the chamber, the rotor being mounted on the shaft.

5. The variable viscosity damper of claim 4, wherein said chamber has an outer ring that has a length in direction of a central axis of the shaft greater than center portions of the chamber adjacent the axis of the shaft, and said rotor having an outer flange in the outer ring of the chamber.

6. The variable viscosity damper of claim 3, wherein there is a heater associated with the housing for heating the fluid in the chamber, and the controller being coupled to control the heater to maintain the temperature of the fluid at substantially a constant level.

7. The variable viscosity damper of claim 6, wherein there are a plurality of instruments and said input parameters include at least one of aircraft configuration, angle of attack, rate of change of angle of attack, altitude, air turbulence, and air speed.

8. The variable viscosity damper of claim 1, wherein said fluid is a magnetorheological fluid, an electromagnet mounted to provide a magnetic field influencing the magnetorheological fluid, and wherein said signal comprises a control signal for changing the magnetic field acting on the fluid.

9. An angle of attack sensor comprising a vane mounted on a shaft, a housing supporting the shaft and the vane, a chamber in the housing, the shaft extending into the chamber, a rotor in the chamber drivably mounted on the shaft, a quantity of electrorheological or magnetorheological fluid in the chamber, and a controller to provide a signal to control the viscosity of the fluid in the chamber as a function of at least one aircraft operational parameter.

10. The angle of attack sensor of claim 9 and an agitation device to selectively agitate the fluid.

11. The angle of attack sensor of claim 9 and a heater for heating the fluid in the chamber to a desired set level.

12. The angle of attack sensor of claim 9 wherein said input parameters include at least one of aircraft configuration, angle of attack, rate of change of angle of attack, altitude, air turbulence, and air speed.

13. The angle of attack sensor of claim 9 wherein said chamber has an outer ring that has a length in direction of a control axis of the shaft greater than center portions of the chamber adjacent the axis of the shaft, and said rotor having an outer flange in the outer ring of the chamber.

14. The angle of attack sensor of claim 9 wherein there is an encoder coupled to the shaft for providing a signal indicating shaft rotational position.

* * * * *